US012806660B2

(12) United States Patent
Sauter et al.

(10) Patent No.: US 12,806,660 B2
(45) Date of Patent: Nov. 24, 2026

(54) PRESSURE WASHER

(71) Applicant: Andreas Stihl AG & Co. KG, Waiblingen (DE)

(72) Inventors: Matthias Sauter, Stuttgart (DE); Klaus Kaupp, Waiblingen (DE); Anna Mirl, Esslingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 207 days.

(21) Appl. No.: 18/416,586

(22) Filed: Jan. 18, 2024

(65) Prior Publication Data

US 2024/0246121 A1 Jul. 25, 2024

(30) Foreign Application Priority Data

Jan. 20, 2023 (DE) ..................... 10 2023 101 418.8

(51) Int. Cl.
*B08B 3/02* (2006.01)

(52) U.S. Cl.
CPC ...... *B08B 3/026* (2013.01); *B08B 2203/0205* (2013.01); *B08B 2203/0229* (2013.01)

(58) Field of Classification Search
CPC ............ B08B 3/026; B08B 2203/0205; B08B 2203/0229
USPC .......................................................... 239/126
See application file for complete search history.

(56) References Cited

U.S. PATENT DOCUMENTS 5,397,054 A 3/1995 Ziegs
9,901,943 B2 * 2/2018 Schmalz ............... B05B 7/1209
2008/0061167 A1 * 3/2008 Gansebom .............. B05B 1/169 239/394
2009/0078293 A1 * 3/2009 Hasegawa ............... B08B 15/04 134/109
2012/0018534 A1 * 1/2012 Gilpatrick ............. B05B 7/0876 239/310
2012/0213652 A1 8/2012 Nathan et al.
2015/0108253 A1 * 4/2015 Schmalz ............... B05B 7/0087 239/419.5
2017/0282219 A1 * 10/2017 Kloepfer ................. B08B 3/026
(Continued)

FOREIGN PATENT DOCUMENTS

CN 205744408 U 11/2016
DE 39 36 155 A1 5/1991
(Continued)

*Primary Examiner* — Chee-Chong Lee
(74) *Attorney, Agent, or Firm* — Walter Ottesen, P.A.

(57) ABSTRACT

A pressure washer includes a connection for a fluid source, a pump, a motor. A main line has a suction chamber between a connection to a spray opening and a pump and a pressure chamber between the pump and the spray opening which are fluidically connected via a bypass line. To regulate the pressure in the pressure chamber, a free cross-sectional surface of the bypass line is adjustable. A switch-off unit causes, as a result of the pressure prevailing in the pressure chamber, that the motor is in the off-state if the pressure chamber pressure corresponds at least to a pressure threshold. A pressure build-up valve is arranged in the bypass line reducing the free cross-sectional surface of the bypass line to such an extent when a volume threshold of flow through the bypass line is exceeded, the pressure in the pressure chamber corresponds at least to the pressure threshold.

16 Claims, 7 Drawing Sheets

(56) References Cited

U.S. PATENT DOCUMENTS

| | | | | |
|---|---|---|---|---|
| 2018/0133726 | A1* | 5/2018 | Schmalz | B05B 7/0425 |
| 2019/0283061 | A1* | 9/2019 | Qiao | B08B 3/02 |

FOREIGN PATENT DOCUMENTS

| | | | |
|---|---|---|---|
| DE | 43 28 382 | A1 | 3/1994 |
| DE | 44 45 520 | C1 | 7/1996 |
| DE | 20 2007 006 543 | U1 | 7/2007 |
| DE | 10 2007 021 381 | A1 | 11/2007 |
| EP | 0 608 796 | A1 | 8/1994 |
| EP | 0 668 113 | A1 | 8/1995 |
| EP | 0 793 017 | A2 | 9/1997 |
| EP | 2 483 558 | B1 | 8/2012 |
| EP | 4 079 419 | A1 | 10/2022 |
| WO | 2016/102075 | A1 | 6/2016 |

* cited by examiner

PRESSURE WASHER

CROSS-REFERENCE TO RELATED APPLICATIONS

This application claims priority of German patent application no. 10 2023 101 418.8, filed Jan. 20, 2023, the entire content of which is incorporated herein by reference.

BACKGROUND

A pressure washer is known from WO 2016/102075 A1, the pressure chamber of which pressure washer is connected via a return line to the suction chamber. The free cross-sectional surface of the return line is adjustable in a step-by-step manner by the user. As a result of this, the pressure in the pressure chamber can be regulated. The cleaning fluid can be sprayed out with various pressures. The pressure washer furthermore includes a valve tappet which is acted upon with the pressure from the pressure chamber. If spraying out from the pressure chamber is prevented, because the operator is no longer pushing on the corresponding pressure lever and the corresponding line is closed, the pressure in the pressure chamber increases. This pressure acts on the valve tappet which moves when a certain pressure threshold is overcome and actuates a microswitch in order to switch off the drive motor. This prevents the drive motor from continuing to run permanently in the case of a closed spray valve and an ever increasing pressure building up in the pressure chamber.

An opened return line can cause the problem in the case of a correspondingly large free cross-sectional surface that the pressure in the pressure chamber does not increase above the pressure threshold value after the spray line closes. It can consequently occur that the valve tappet cannot be moved to switch off the drive motor. The drive motor then remains on and pumps fluid via the return line in the circuit. This unnecessarily wastes energy and unnecessarily wears the components of the pressure washer.

SUMMARY

It is an object of the disclosure to further develop a pressure washer in such a manner that a pressure regulation of the pressure in the pressure chamber is possible by adjustment of a free cross-sectional surface of a bypass line and that at the same time a low-wear and energy-saving operation of the pressure washer is possible.

This object is, for example, achieved by a pressure washer having: a connection for a fluid source; a high pressure pump; a motor configured to drive the high pressure pump, wherein the motor has an on state and an off state; a main line through which fluid is conveyable from the connection to a spray opening of the main line via the high pressure pump; a switch-off unit; the main line having a suction chamber between the connection and the high pressure pump, wherein the main line has a pressure chamber between the high pressure pump and the spray opening; the pressure chamber being fluidically connected to the suction chamber via a bypass line, wherein the pressure washer is configured so that, in order to regulate a pressure in the pressure chamber, a free cross-sectional surface of the bypass line is configured to be adjusted by a user; wherein the pressure washer is configured such that the switch-off unit causes, as a result of the pressure which prevails in the pressure chamber, the motor to be in the off state if the pressure in the pressure chamber corresponds at least to a pressure threshold value; a pressure build-up valve arranged in the bypass line; and, wherein the pressure washer is configured such that the pressure build-up valve reduces the free cross-sectional surface of the bypass line at least to such an extent when a volume threshold value of a volumetric flow through the bypass line is exceeded, that the pressure in the pressure chamber corresponds at least to the pressure threshold value.

The disclosure provides that the pressure washer is configured so that the switch-off unit brings about as a result of the pressure which prevails in the pressure chamber that the motor is in the off state if the pressure in the pressure chamber corresponds at least to a pressure threshold value. In order to be able to reliably ensure that the pressure in the pressure chamber can reach the pressure threshold value, a pressure build-up valve is arranged in the bypass line. The pressure washer is configured so that the pressure build-up valve reduces the free cross-sectional surface of the bypass line at least to such an extent when a volume threshold value of the volumetric flow through the bypass line is exceeded that the pressure in the pressure chamber corresponds at least to the pressure threshold value. If the main line is closed so that no fluid can exit from the spray opening anymore, the volumetric flow through the bypass line will increase. If the volumetric flow exceeds a volume threshold value, the free cross-sectional surface of the bypass line through the pressure build-up valve is at least reduced to such an extent that the pressure in the pressure chamber corresponds at least to the pressure threshold value. Due to the fact that the pressure in the pressure chamber corresponds at least to the pressure threshold value, the switch-off unit brings about that the motor is in the off state. In this manner, it is ensured that the motor for driving the high pressure pump is switched off upon closing of the main line. In this manner, energy can be saved. Fluid is prevented from being unnecessarily pumped in the circuit. As a result of this, the components of the pressure washer are exposed to a lower degree of wear. The service life of the pressure washer is increased.

In particular, the pressure build-up valve is configured so that it closes the bypass line when the volume threshold value of the volumetric flow through the bypass line is exceeded so that a throughflow of fluid through the bypass line is prevented. In this manner, a pressure build-up in the pressure chamber can be performed particularly quickly and effectively. In particular, the pressure threshold value can be reached particularly quickly.

A bypass valve is advantageously arranged in the bypass line. The free cross-sectional surface of the bypass line can preferably be adjusted by a user via the bypass valve in order to regulate the pressure in the pressure chamber. As a result of this, the pressure in the pressure chamber can be easily adjusted by the user. In particular, an adjustment of the pressure in the pressure chamber as a function of the type of motor used is possible. For this purpose, the free cross-sectional surface of the bypass line must only be changed via the bypass valve.

A main line valve is expediently arranged in the main line. The main line valve in a closed state prevents a throughflow of fluid through the main line. The main line valve in an open state allows a throughflow of fluid through the main line. The pressure washer is preferably configured so that the pressure in the pressure chamber corresponds at least to the threshold value once the main line valve has been switched from the open state into the closed state. In particular, this is brought about by reducing the free cross-sectional surface of the bypass line or closing the bypass line through the pressure build-up valve. The switch-off unit advantageously switches the motor into the off state during or after the transition of the main line valve from the open state into the closed state.

The motor advantageously has a switch for switching the motor between the on state and the off state. In particular, the switch-off unit has an actuating element. The pressure washer is advantageously configured such that the fluid in the pressure chamber acts on the actuating element so that the actuating element actuates the switch of the motor so that the motor is in the off state if the pressure in the pressure chamber corresponds at least to the pressure threshold value. The motor can be easily transferred by the switch into the off state when the pressure threshold value in the pressure chamber is exceeded.

In a further embodiment of the disclosure, the pressure washer has a pressure relief line. The pressure relief line connects the pressure chamber fluidically to the suction chamber. A pressure relief valve is expediently arranged in the pressure relief line. The pressure relief valve is configured so that it opens if the pressure in the pressure chamber corresponds at least to the pressure threshold value. As a result of this, a pressure equalization between the pressure chamber and the suction chamber can take place. This is in particular also possible when the motor has already been transferred into the off state. The pressure equalization between the pressure chamber and the suction chamber protects the components of the pressure washer. As a result of this, the service life of the pressure washer is lengthened. Low-wear operation of the pressure washer is enabled.

The pressure relief valve has a valve member. In a further embodiment of the disclosure, the valve member is movable jointly with the actuating element. Components and installation space can be saved as a result of this. Due to the fact that the pressure washer is configured such that the actuating element is also moved in the case of a movement of the valve member as a result of the pressure in the pressure chamber acting on the valve member, a simple structure of the pressure washer is possible.

The pressure washer is expediently configured so that the switch-off unit is only acted upon with a single pressure value of the pressure chamber. As a result of this, a simple configuration of the pressure washer is possible. In particular, a complicated configuration based on a pressure actuation of the switch-off unit on one hand with an injector pressure and on the other hand with the pressure value in the pressure chamber upstream of the venturi can be avoided.

In a further embodiment of the disclosure, the pressure washer is configured so that there is a fluidic connection between the pressure chamber and the suction chamber if the pressure in the pressure chamber corresponds at most to a starting pressure value. In particular, the starting pressure value is smaller than the pressure threshold value. This enables easy and low-resistance starting of the pump and the drive motor. The fluidic connection between pressure chamber and suction chamber prevents the pump and the motor from having to work against an ever greater pressure in the pressure chamber. The starting phase is in particular facilitated as a result of this.

The pressure washer expediently includes a start valve. The pressure washer is advantageously configured so that the start valve closes the start valve when a starting volume threshold value of the volumetric flow through the start valve is exceeded. As a result of this, a sufficiently large pressure can build up in the pressure chamber after a starting phase of the pump and the motor. The start valve can be provided to interrupt the fluidic connection between the pressure chamber and the suction chamber after the starting volume threshold value of the volumetric flow through the start valve is exceeded.

In particular, the start valve is formed separately from the pressure build-up valve.

It can also be provided that the start valve is arranged in the bypass line. The start valve and the bypass valve expediently possess a joint valve member. As a result of this, a compact configuration of the pressure washer is possible. The number of components required can be minimized as a result of this. In particular, the start valve and the pressure build-up valve possess a joint valve member.

The switch-off unit is expediently connected fluidically to the pressure chamber. As a result of this, the pressure of the pressure chamber can act on the switch-off unit.

The pressure washer expediently includes a check valve. In particular, the check valve is arranged in the pressure chamber downstream of the bypass line and upstream of the switch-off unit. This brings about that the pressure on the switch-off unit can only increase as long as the motor for driving the high pressure pump is running and the main line valve is in the closed state. This can also bring about that the pressure on the pressure relief valve can only increase as long as the motor for driving the high pressure pump is running and the main line valve is in the closed state. It is thus ensured that the pressure in the pressure chamber exceeds the pressure threshold value and the switch-off unit transfers the motor into the off state. It can likewise thus be ensured that the pressure in the pressure chamber exceeds the pressure threshold value and opens the pressure relief valve.

BRIEF DESCRIPTION OF DRAWINGS

The invention will now be described with reference to the drawings wherein.

DETAILED DESCRIPTION

Figure 1:
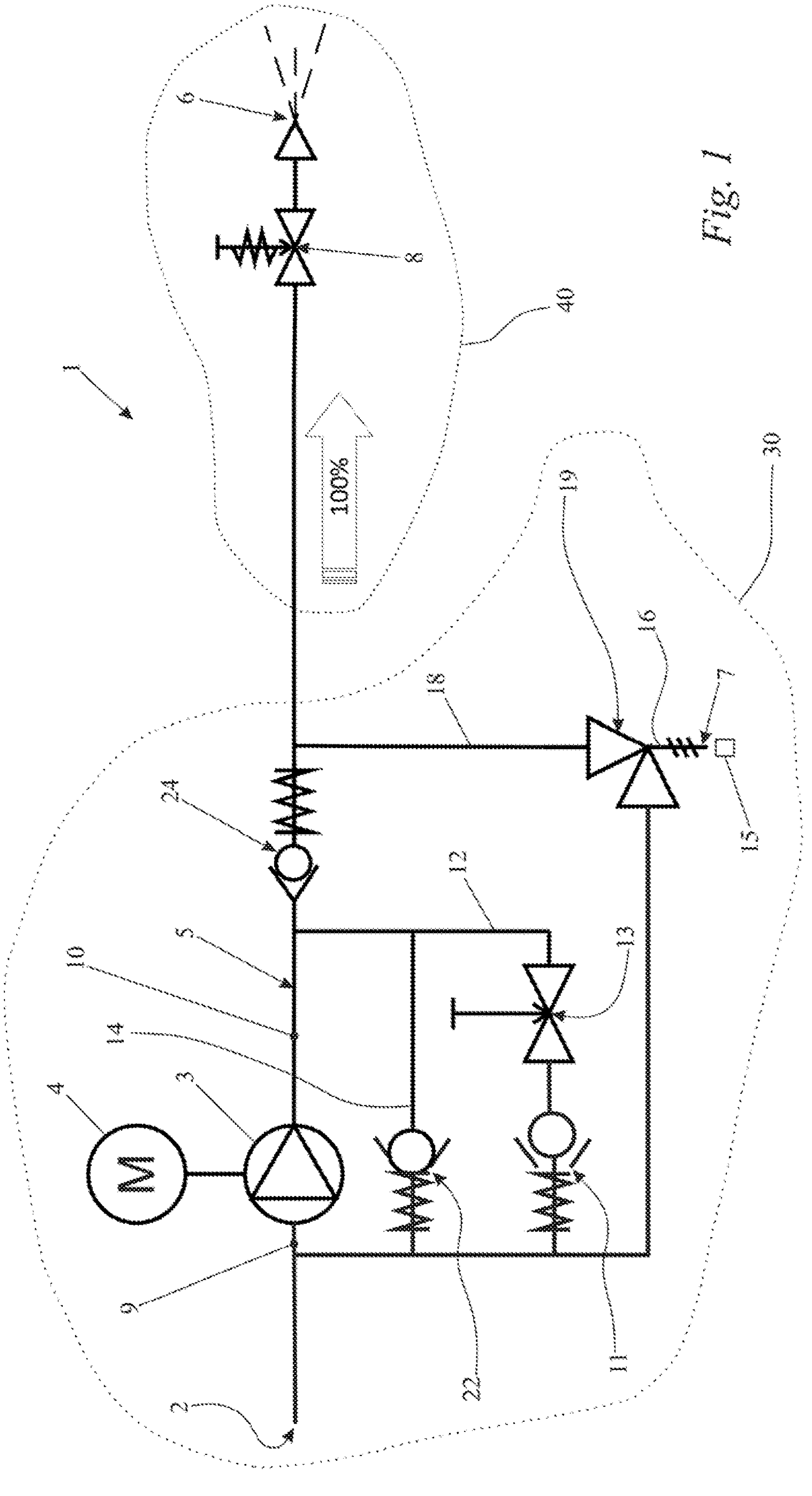
FIG. 1 shows a schematic representation of a pressure washer with a closed bypass line and open main line.

FIG. 1 shows a pressure washer 1. The pressure washer 1 includes a pump unit 30 and a sprayer unit 40. The pump unit 30 and the sprayer unit 30 are fluidically connected to one another via a main line 5. In the embodiment, the sprayer unit 40 includes a gun, not represented. It can, however, also be provided that the sprayer unit includes a gun and a lance.

The pressure washer 1 includes a connection 2 for a fluid source. In the embodiment, the fluid source is an external fluid source. The external fluid source can be, for example, a domestic water network. It can, however, also be provided that the fluid source is an integral component of the pressure washer.

The pressure washer 1 includes a spray opening 6. The pressure washer 1 includes the main line 5. The main line 5 of the pressure washer 1 connects the connection 2 fluidically to the spray opening 6. The connection 2 is arranged on the pump unit 30. The spray opening 6 is arranged on the sprayer unit 40. In the embodiment, the spray opening 6 is arranged on the sprayer unit 40 formed as a gun. It can, however, also be provided that the spray opening 6 is arranged on an exchangeable lance of the sprayer unit 40.

The pressure washer 1 includes a high pressure pump 3. Fluid can be conveyed from the connection 2 through the main line 5 to the spray opening 6 via the high pressure pump 3. The fluid source supplies fluid to the main line 5. The high pressure pump 3 is arranged in the main line 5. The high pressure pump 3 pressurizes the fluid. The main line 5 possesses a suction chamber 9 and a pressure chamber 10. The high pressure pump 3 is arranged between the suction chamber 9 and the pressure chamber of the main line 5. The main line 5 has the suction chamber 9 between the connection 2 and the high pressure pump 3. The main line 5 has the pressure chamber 10 between the high pressure pump 3 and the spray opening 6. In the embodiment, the suction chamber 9 is formed by a portion of the main line 5 between the connection 2 and the high pressure pump 3. In the embodiment, the pressure chamber 10 is formed by a portion of the main line between the high pressure pump 3 and the spray opening 6. The high pressure pump conveys fluid from the suction chamber 9 to the pressure chamber 10. A greater pressure prevails in the pressure chamber 10 than in the suction chamber 9. The suction chamber 9 and the pressure chamber 10 are components of the main line 5. Downstream of the high pressure pump 3, a greater pressure prevails in the main line 5 than upstream of the high pressure pump 3.

The high pressure pump 3 is arranged in the pump unit 30. In order to drive the high pressure pump 3, the pressure washer 1 has a motor 4. The motor 4 is arranged in the pump unit 30. The motor can be formed as a brushless direct current motor. A brushless direct current motor is also referred to as an EC motor. The motor 4 can involve a universal motor. In the embodiment, the motor 4 is an induction motor. In the embodiment, the induction motor is operated with alternating voltage. The voltage source can be made available, for example, by the supply voltage. If battery operation is provided, the motor can be a brushless direct current motor. It can be provided that the battery is a component of the pressure washer 1.

The pressure washer 1 includes a main line valve 8. The main line valve 8 is arranged in the main line 5. The main line valve 8 has two valve states. The two valve states include a closed state and an open state. In the open state, the main line valve 8 allows a throughflow of fluid through the main line. In the closed state, the main line valve 8 prevents a throughflow of fluid through the main line 5. In the open state of the main line valve 8, fluid is sprayed out of the spray opening 6. In the closed state of the main line valve 8, no fluid is sprayed out of the spray opening 6. In the embodiment, the main line valve 8 is arranged in the sprayer unit 40. In the embodiment, the main line valve 8 is arranged between the high pressure pump 3 and the spray opening 6.

The pressure washer 1 has a bypass line 12. The pressure chamber 10 is connected fluidically to the suction chamber 9 through the bypass line 12. A further fluidic connection is possible through the bypass line 12 from the suction chamber 9 and pressure chamber 10 separately from the fluidic connection of the suction chamber 9 to the pressure chamber 10 via the high pressure pump 3.

If the high pressure pump 3 is in operation, a greater pressure prevails in the pressure chamber 10 than in the suction chamber 9. As a result of this pressure gradient, fluid can flow from the pressure chamber 10 into the suction chamber 9 through the bypass line 12. The pressure washer 1 is configured so that a free cross-sectional surface of the bypass line 12 can be adjusted by a user in order to regulate the pressure in the pressure chamber 10.

A bypass valve 13 is arranged in the bypass line 12. The free cross-sectional surface of the bypass line 12 can be adjusted via the bypass valve 13. As a result of this, the pressure in the pressure chamber 10 can be regulated. In the case of a larger free cross-sectional surface, the pressure equalization between the pressure chamber 10 and the suction chamber 9 is performed to a greater extent. Should a high pressure prevail in the pressure chamber 10, the free cross-sectional surface of the bypass line 12 is reduced via the bypass valve 13. The larger the free cross-sectional surface of the bypass line 13, the greater the volumetric flow through the bypass line 12 during operation, with otherwise unchanged conditions. In the embodiment, the free cross-sectional surface of the bypass line 12 can be adjusted by a user via the bypass valve 13.

The bypass valve 13 can be adjusted between a completely closed state and a completely open state in a step-by-step manner or continuously. The bypass valve 13 can have various degrees of closing between the completely closed state and the completely open state. In the embodiment, the bypass valve 13 is at least in portions continuously adjustable. It can, however, also be provided that the bypass valve is adjustable between the completely closed state and the completely open state in a continuous manner without interruptions.

The magnitude of the volumetric flow of the fluid in the main line 5 can be adjusted as a function of the degree of closing of the bypass valve 13. The greater extent to which the bypass valve 13 is closed, the smaller the free cross-sectional surface of the bypass line 12 as long as the free cross-sectional surface of the bypass line 12 is not influenced by a further component. The greater extent to which the bypass valve 13 is closed, the greater the volumetric flow of the fluid in the main line 5. The greater extent to which the bypass valve 13 is closed, the greater the volumetric flow of the fluid in the main line 5 which is present at the spray opening 6.

In the embodiment, the bypass valve 13 is adjustable via an operating element. The operating element is arranged on the sprayer unit 40. The free cross-sectional surface of the bypass line 12 can be adjusted via the operating element. The pressure in the main line 5, in particular in the pressure chamber 10, can be regulated in particular at the spray opening 6 by adjusting the bypass valve 13.

The sprayer unit 40 is movable with respect to the pump unit 30. In the embodiment, the main line 5 is formed as a flexible hose between the pump unit 30 and the sprayer unit 30. The spray opening 6 is arranged on the sprayer unit 40. The sprayer unit 40 can be directed toward an object with its spray opening 6, which object is supposed to be cleaned. The sprayer unit 40 is guidable by hand. A user can guide the sprayer unit 40 with one hand and simultaneously operate the operating element with the same hand.

The pressure washer 1 includes a switch-off unit 7. The pressure washer 1 is configured so that the switch-off unit 7 brings about as a result of the pressure prevailing in the pressure chamber 10 that the motor 4 is in the off state if the pressure in the pressure chamber corresponds at least to a pressure threshold value.

The motor 4 has a switch 15. The switch 15 serves to switch the motor 4 between the on state and the off state. The switch-off unit 7 has an actuating element 16. The pressure washer 1 is configured so that the fluid in the pressure chamber 10 acts on the actuating element 16 of the switch-off unit 7 so that the actuating element 16 actuates the switch 15 of the motor 4 so that the motor 4 is in the off state if the pressure in the pressure chamber 10 corresponds at least to the pressure threshold value.

A pressure build-up valve 11 is arranged in the bypass line 12. The pressure washer 1 is configured so that the pressure build-up valve 11 reduces the free cross-sectional surface of the bypass line 12 when a volume threshold value of the volumetric flow through the bypass line 12 is exceeded at least to such an extent that the pressure in the pressure chamber 10 corresponds at least to the pressure threshold value. As a result of this, an increasing volumetric flow in the bypass line 12 can be used to close the pressure build-up valve 11 at least to such an extent that the pressure in the pressure chamber 10 is sufficient to switch off the motor 4 via the switch-off unit 7. The pressure washer 1 is configured so that the free cross-sectional surface of the bypass line 12 as a result of the pressure build-up valve 11 in the case of a volumetric flow through the bypass line 12 above the volume threshold value is at least so small that the pressure in the pressure chamber 10 corresponds at least to the pressure threshold value.

In the embodiment, when the volume threshold value of the volumetric flow through the bypass line 12 is exceeded, the pressure build-up valve 11 completely closes the bypass line 12 so that a throughflow of fluid through the bypass line 12 is prevented. The pressure washer 1 is configured so that the bypass line 12 as a result of the pressure build-up valve 11 in the case of a volumetric flow through the bypass line 12 above the volume threshold value is closed and that the pressure in the pressure chamber 10 thereafter corresponds at least to the pressure threshold value.

A pressure relief line 18 is represented in FIG. 1. The pressure relief line 18 connects the pressure chamber 10 fluidically to the suction chamber 9. As a result of the pressure relief line 18, a further fluidic connection of the suction chamber 9 and pressure chamber 10 separately from the fluidic connection of the suction chamber 9 to the pressure chamber 10 via the high pressure pump 3 and also separately from the bypass line 12 is possible.

The pressure relief line 18 can be closed or open. A pressure relief valve 19 is arranged in the pressure relief line 18. The pressure relief valve 19 is configured so that it opens if the pressure in the pressure chamber 10 corresponds at least to the pressure threshold value.

The pressure washer 1 is configured so that there is a fluidic connection between the pressure chamber 10 and the suction chamber 9 if the pressure in the pressure chamber 10 corresponds at most to a starting pressure value. The starting pressure value is smaller than the pressure threshold value. In the embodiment, the pressure washer 1 has a start line 14. The start line 14 connects the pressure chamber 10 fluidically to the suction chamber 9. As a result of the start line 14, a further fluidic connection of the suction chamber 9 and pressure chamber 10 separately from the fluidic connection of the suction chamber 9 to the pressure chamber 10 via the high pressure pump 3, separately from the pressure relief line 18 and separately from the bypass line 12 is possible. It can however, also be provided that the fluidic connection between the pressure chamber 10 and the suction chamber 9, if the pressure in the pressure chamber 10 corresponds at most to the starting pressure value, is produced in particular through the bypass line.

The pressure washer 1 includes a start valve 22. The pressure washer 1 is configured so that the start valve 22 closes the start valve 22 when a starting volume threshold value of the volumetric flow through the start valve 22 is exceeded. Embodiments without a start valve and without a start line can, however, also be provided. In the embodiment, the start valve 22 is arranged in the start line 14. It can, however, also be provided that the start valve 22 is arranged in the bypass line.

The pressure washer 1 includes a check valve 24. The check valve 24 is arranged in the pressure chamber 10. The check valve 24 is arranged downstream of the bypass line 12 in the pressure chamber 10. The check valve 24 is arranged upstream of the switch-off unit 7 in the pressure chamber 10.

FIG. 1 shows the pressure washer 1 in a situation in which the motor 4 is in the on state. The pump 3 conveys a volumetric flow of fluid through the main line 5. The main line valve is in the open state in which it allows a throughflow of fluid through the main line 5. The bypass line 12 is closed. This occurs in the embodiment by closing the bypass valve 13. In the embodiment, in this situation, the bypass line 12 is completely closed via the bypass valve 13. 100% of the volumetric flow conveyed by the pump 3 is conveyed through the pressure chamber 10 of the main line 5 to the spray opening 6. 100% of the conveyed volumetric flow leaves the pressure washer 1 through the spray opening 6.

The pressure relief line 18 is completely closed in the situation represented in FIG. 1. In the embodiment, the pressure relief line 18 is completely closed via the pressure relief valve 19.

In the situation represented in FIG. 1, the start line 14 is completely closed. In the embodiment, this occurs through the start valve 22.

Figure 2:
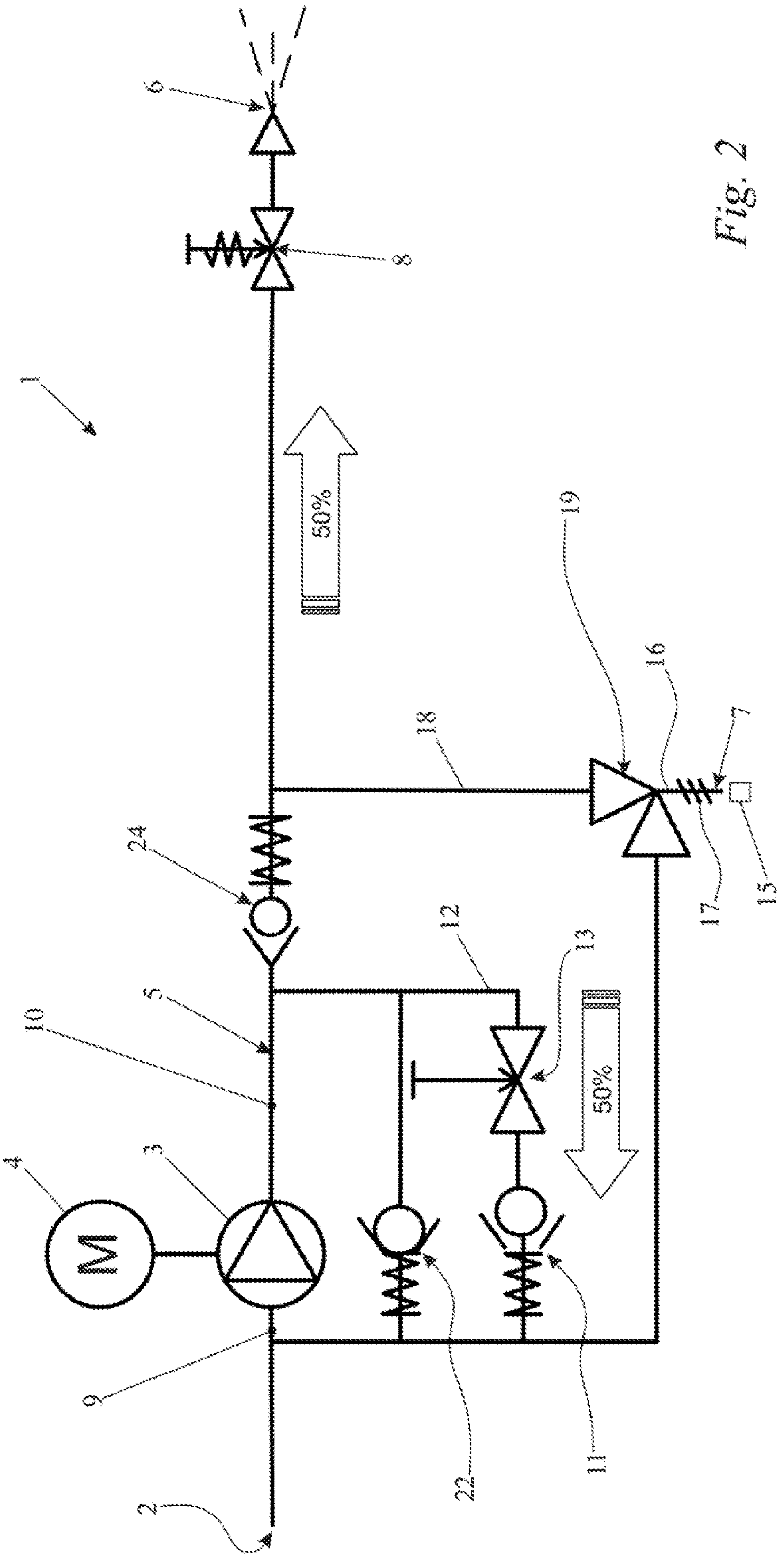
FIG. 2 shows a schematic representation of the pressure washer from FIG. 1 with a fully open bypass line and open main line.

In the transition from the situation represented in FIG. 1 to the situation represented in FIG. 2, a return flow from the pressure chamber 10 into the suction chamber 9 through the bypass line 12 is allowed. In the embodiment, this occurs by opening the bypass valve 13. In the embodiment, in FIG. 2, the bypass valve 13 is completely closed. This is brought about, for example, in that half of the volumetric flow conveyed by the pump 3 flows through the bypass line 12 from the pressure chamber back into the suction chamber 9. The other half of the volumetric flow conveyed by the pump 3 is conveyed to the spray opening 6 and sprayed out there.

The pressure build-up valve 11 arranged in the bypass line 12 is open both in the situation represented in FIG. 1 and also in the situation represented in FIG. 2. In both figures, the volumetric flow through the bypass line 12 is below a volume threshold value. In FIG. 2, the pressure relief valve 19 in the pressure relief line 18 is furthermore closed. The pressure in the pressure chamber 10 is below the pressure threshold value. The switch-off unit 7 does not actuate the switch 15 in this situation. The pressure in the pressure chamber 10 is not sufficient to press the actuating element 16 of the switch-off unit 7 against the switch 15 so that the motor 4 is switched off. As represented in FIG. 2, the pressure washer 1 includes a spring 17. The spring 17 is a component of the switch-off unit 7. The spring 17 pretensions the switch-off unit 7, in the embodiment the actuating element 16 in the unactuated state of the switch 15 of the motor 4. In order to actuate the switch 15, a force must be applied by the fluid in the pressure chamber 10, which force moves the actuating element 16 counter to the force of the spring 17 in the direction of the switch 15.

Figure 3:
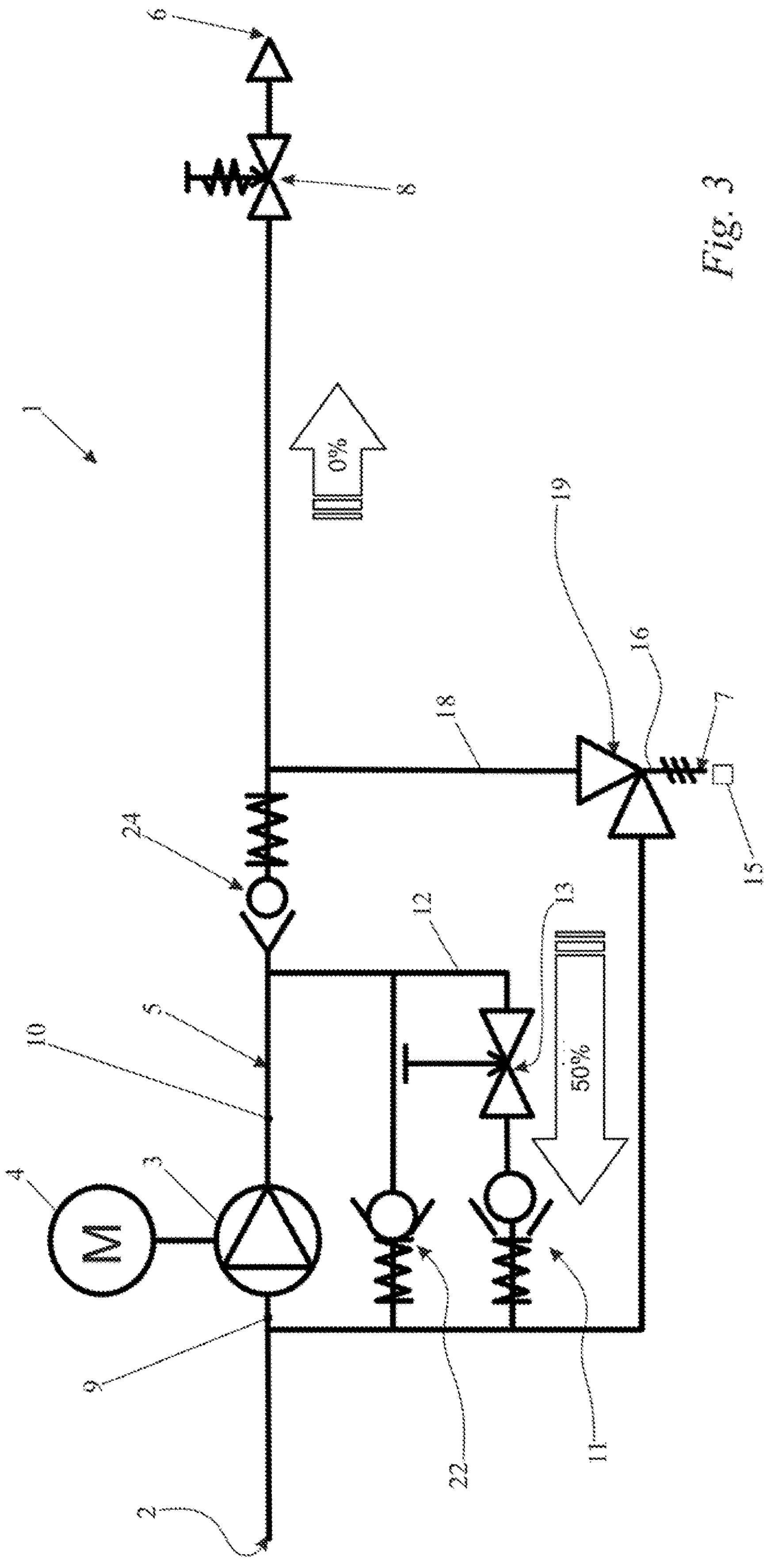
FIG. 3 shows a schematic representation of the pressure washer from FIG. 1 in the case of an open bypass line and closed main line.
Figure 4:
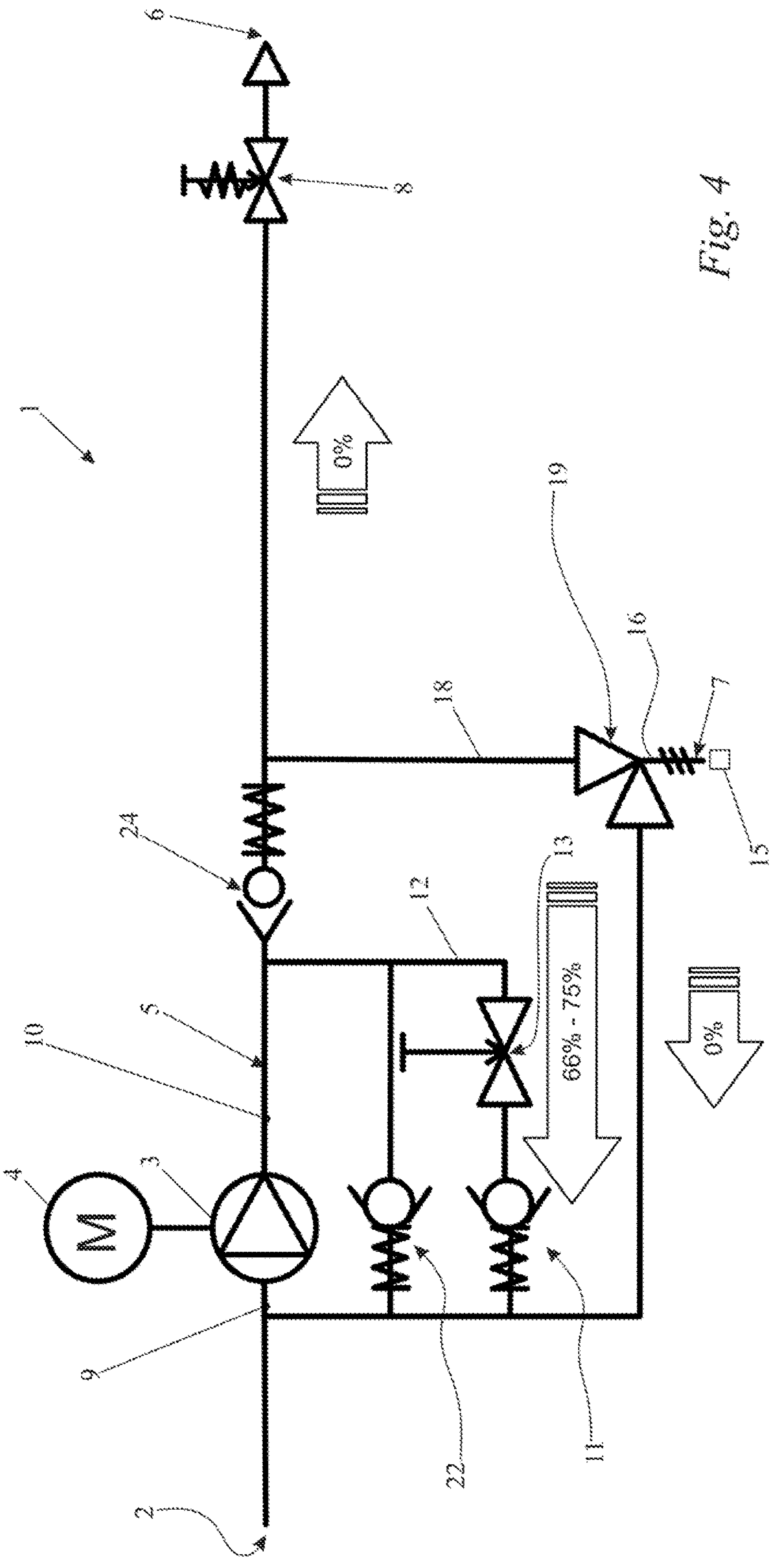
FIG. 4 shows a schematic representation of the pressure washer from FIG. 1 in the case of a closed main line, fully open bypass valve and closed pressure build-up valve.

In the situation represented in FIG. 3, in contrast to FIG. 2, the main line valve 8 is in the closed state. Immediately after closing the main line valve 8, no volumetric flow of the fluid conveyed by the pump 3 reaches the spray opening 6 anymore. The start valve 22 is furthermore closed. The fluid can flow via the bypass line 12 from the pressure chamber 10 back into the suction chamber 9. As represented in FIG. 4, the volumetric flow through the bypass line 12 increases. Since fluid can still flow from the pressure chamber 10 into the suction chamber 9 via the bypass line 12 between the situations represented in FIGS. 3 and 4, an at least partial pressure equalization between the pressure chamber 10 and the suction chamber 9 takes place. In the pressure chamber 10, the pressure is not sufficient to be able to actuate the switch-off unit 7.

Figure 5:
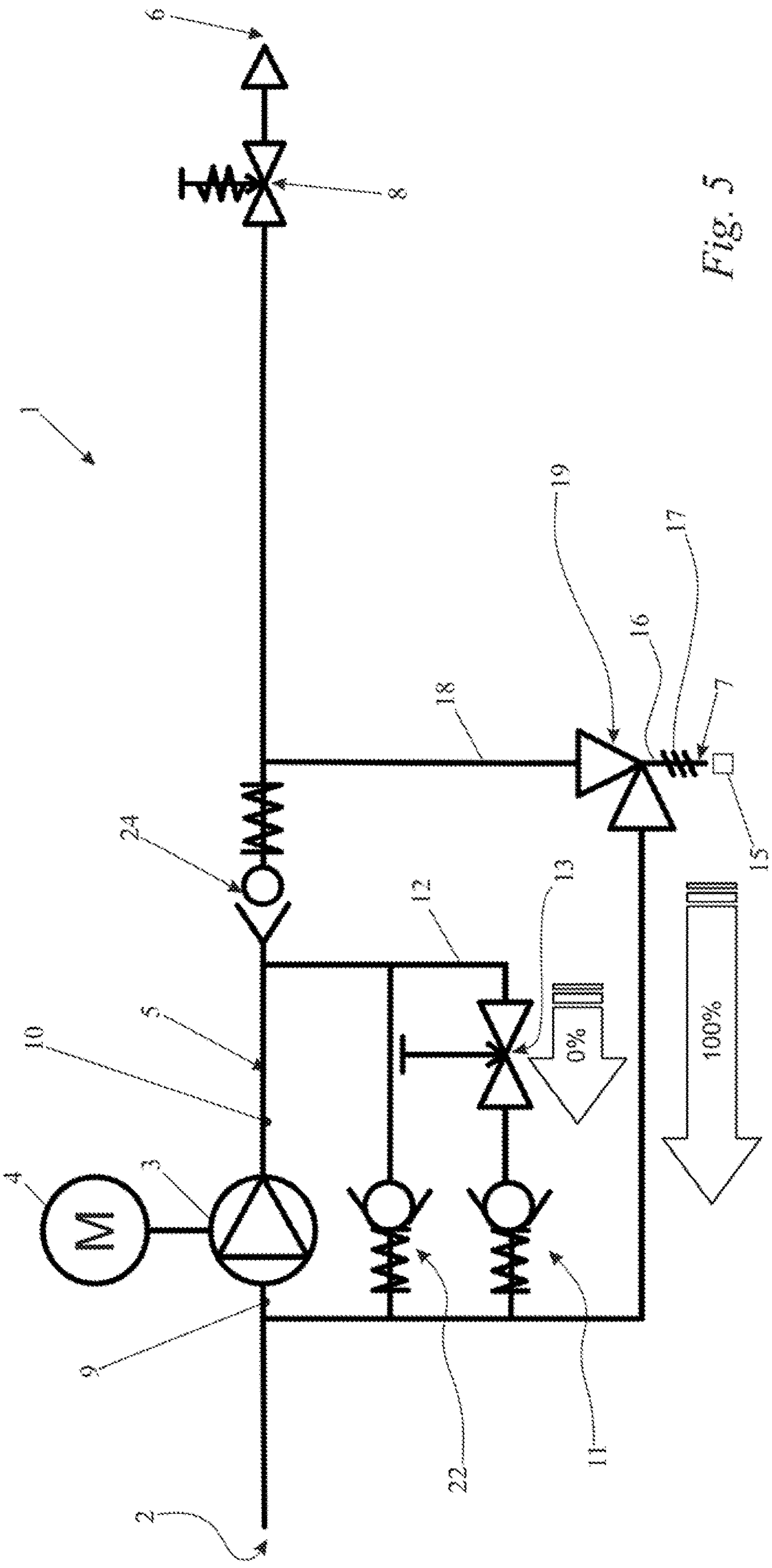
FIG. 5 shows a schematic representation of the pressure washer from FIG. 1 in the case of a closed pressure build-up valve, motor in the off state and open pressure relief valve.

If the volumetric flow through the bypass line exceeds a volume threshold value, the pressure build-up valve 11 closes. In the embodiment, the pressure build-up valve 11 closes if the volumetric flow conveyed through the bypass line 12 corresponds to approximately, in particular precisely ⅔ to ¾ of the volumetric flow conveyed through the pump 3. Other values can, however, also be provided for this purpose. After closing the bypass line 12 via the pressure build-up valve 11, no volumetric flow is conveyed anymore through the bypass line 12 into the suction chamber 9, as represented in FIG. 5. The pressure build-up valve 11 is completely closed in FIG. 5. The bypass valve 13 is furthermore completely closed.

As a result of the now closed bypass line 12, a greater pressure can build up in the pressure chamber 10 with the pump 3 still running. It can also be provided that the free cross-sectional surface of the bypass line 12 is only reduced. This can also lead to an increase in pressure in the pressure chamber 10. In particular, the pressure build-up can be performed since the start valve 22 is still closed.

The pressure washer 1 is configured so that the pressure in the pressure chamber 10 corresponds at least to the pressure threshold value once the main line valve 8 has been switched from the open state into the closed state. The increase in pressure in the pressure chamber 10 is performed since the pump 3 furthermore conveys fluid into the pressure chamber 10 and the main line valve 8 is still closed. All of the other lines which lead from the pressure chamber 10 are also closed. As a result of this, the pressure in the pressure chamber 10 can increase up to the pressure threshold value. The switch-off unit 7 is connected fluidically to the pressure chamber 10. As soon as the pressure threshold value is reached, the switch-off unit 7 brings about that the motor 4 is in the off state. The pressure washer 1 is configured so that the switch-off unit 7 switches the motor 4 into the off state during or after the transition of the main line valve 8 from the open state into the closed state. The pressure of the fluid in the pressure chamber 10 exerts a force on the actuating element 16 which acts counter to the force of the spring 17. The force brought about by the pressure in the pressure chamber 10 is greater than the force of the spring 17. The actuating element 16 is moved in the direction of the switch 15. The switch 15 is actuated. As a result of this, the motor 4 is transferred into the off state. As a result, no fluid is conveyed anymore from the pump 3 into the pressure chamber 10.

The pressure relief valve 19 has a valve member. In the embodiment, the valve member is movable jointly with the actuating element 16. As a result of this, a particularly simple and space-saving configuration of the pressure relief valve 19 and the switch-off unit 7 is produced. The switch-off unit 7 is only acted upon with a single pressure value of the pressure chamber 10 at all times. The pressure of the suction chamber 9 prevails on the other side of the switch-off unit 7. As a result, a simple constructive configuration of the switch-off unit 7 is produced.

In the embodiment, the pressure relief valve 19 opens when the pressure threshold value in the pressure chamber 10 is exceeded. The pressure threshold value is referred to as the pressure relief threshold value. If the pressure in the pressure chamber 10 in the region between the check valve 24 and the main line valve 8 corresponds at least to the pressure threshold value, the pressure relief valve 19 is opened and the motor 4 is in the off state as a result of the pressure present in the pressure chamber 10. In the embodiment, the pressure washer 1 is configured so that the pressure in the pressure chamber 10 corresponds at least to the pressure relief threshold value once the main line valve 8 has been switched from the open state into the closed state. The increase in pressure in the pressure chamber 10 is performed since the pump 3 furthermore conveys fluid into the pressure chamber 10 and the main line valve 8 is still closed. The valve member of the pressure relief valve 19 must firstly be moved from an idle position. A greater pressure is required for this than thereafter for the sliding of the valve member into an opened position of the pressure relief valve. A pressure therefore initially builds up after the closing of the main line valve 8 which is greater than the pressure which is subsequently required to keep the motor 4 in the off state via the switch-off unit 7. The pressure value in the pressure chamber 10 which is necessary to keep the motor 4 in the off state via the switch-off unit 7 is referred to as the motor holding value. The pressure threshold value is greater than the motor holding value. The motor holding value is greater than the starting pressure value. Embodiments are also conceivable in which the pressure threshold value corresponds to the motor holding value. In particular, a configuration without a pressure relief valve can also be provided. If the pressure threshold value which corresponds to the motor holding value is exceeded, only the motor is then transferred into the off state. Pressure relief of the pressure chamber is not provided in such embodiments.

Once the pressure threshold value in the pressure chamber 10 is exceeded, as a result of the opening of the pressure relief valve 19, fluid can flow back from the pressure chamber 10 into the suction chamber 9 through the pressure relief line 18, as represented in FIG. 5. This ensures a partial pressure equalization between the pressure chamber 10 and the suction chamber 9.

Figure 6:
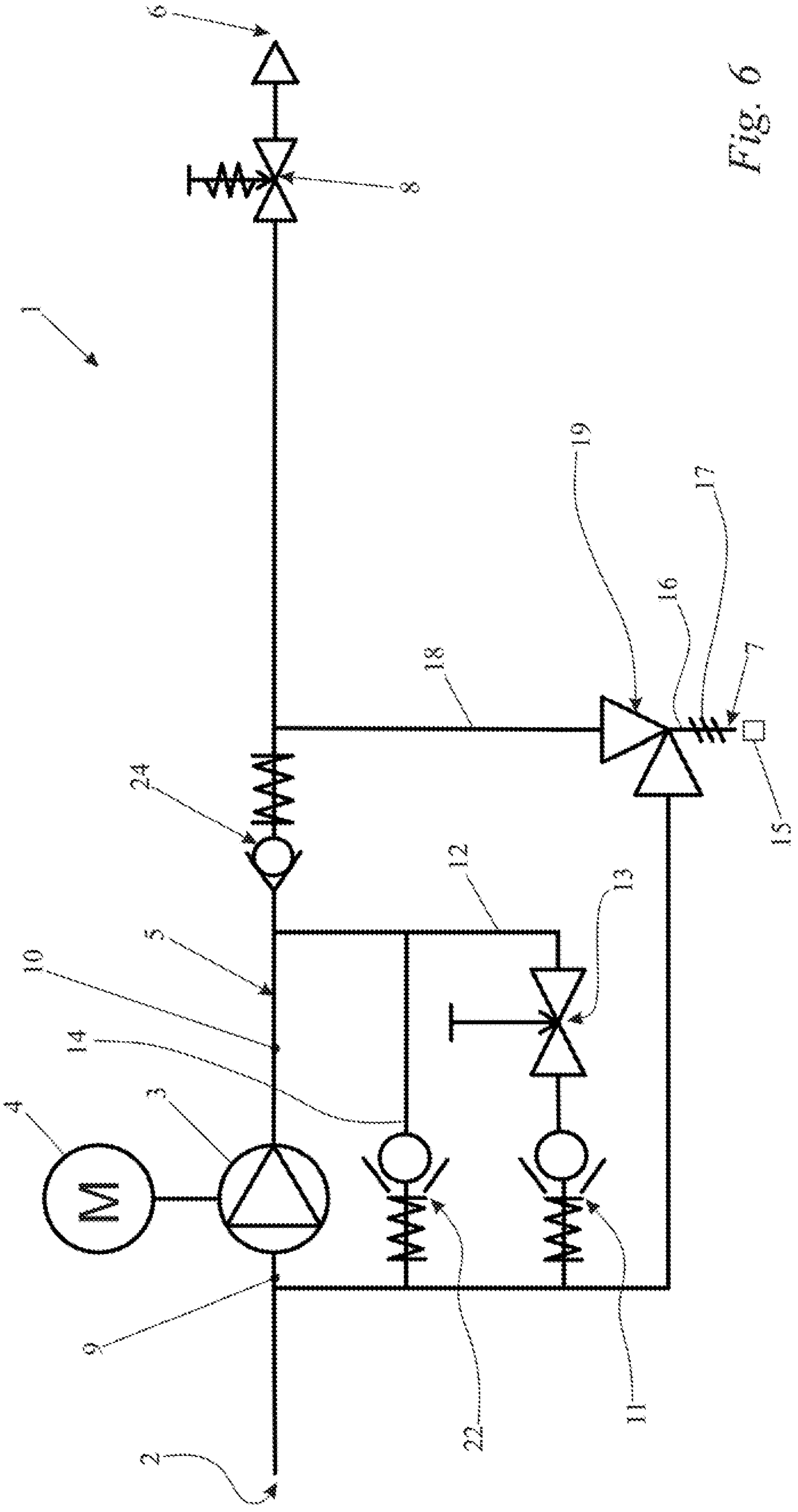
FIG. 6 shows a schematic representation of the pressure washer from FIG. 1 in the case of an open pressure relief valve, open start valve and open pressure build-up valve; and, FIG. 7 shows a schematic representation of an alternative embodiment of a pressure washer in the case of which the start valve and bypass valve possess a joint valve member.

As a result of the drop in pressure in the pressure chamber 10, the pressure in the bypass line 12 also drops. As represented in FIG. 6, the pressure build-up valve 11 therefore opens again in the bypass line 12. The start valve 22 in the start line 14 is then also opened again. The pressure in the part of the main line 5 between the pump 3 and the check valve 24 is then so low that the check valve 24 closes.

As soon as the pressure in the part of the pressure chamber 10 between the check valve 24 and the main line valve 8 drops below the pressure threshold value which is also referred to as the pressure relief threshold value, the pressure relief valve 19 closes the pressure relief line again. The pressure in the part of the pressure chamber 10 between the check valve 24 and the main line valve 8 is greater at this point in time than the motor holding value. In this state, the pressure relief valve 19 is in an intermediate position. In this intermediate position, the pressure relief valve 19 is closed. At the same time, the valve member of the pressure relief valve 19 brings about that the motor 4 is still held in the off state. The valve member of the pressure relief valve 19 is, in the embodiment, operatively connected to the actuating element 16 of the switch-off unit 7 such that the actuating element 16 actuates the switch 15 of the motor 4 so that the motor 4 is in the off state. If the pressure in the part of the pressure chamber 10 between the check valve 24 and the main line valve 8 acts with at least the motor holding value on the switch-off unit 7, the switch-off unit 7 brings about that the motor 4 is in the off state. The force acting as a result of the holding pressure on the actuating element 16 is large enough that the actuating element 16 is pushed against the switch 15. The motor 4 remains in the off state. The pressure relief valve 19 is closed. The pressure value in the part of the pressure chamber 10 between the check valve 24 and the main line valve 8 lies in a holding pressure value range. The holding pressure value range is between the motor holding value and the pressure threshold value.

In this state represented in FIG. 6 of the pressure washer 1, the check valve 24 is closed, the pressure relief valve 19 is closed, the main line valve 8 is closed and the switch-off unit 7 brings about that the motor 4 is in the off state. This state is stable as long as the main line valve 8 is opened and the pressure value in the part of the pressure chamber 10 between the check valve 24 and the main line valve 8 falls below the motor holding value. The force which is brought about by the pressure in the part of the pressure chamber 10 between the check valve 24 and the main line valve 8 on the actuating element 16 is then no longer sufficient that the actuating element 16 is pushed counter to the force of the spring 17 onto the switch 15. As soon as the switch 15 is no longer pushed, it jumps back into its unactuated state and the motor 4 is transferred into its on state. The switch 15 can jump back into its unactuated state as a result of the force of a spring. A different mechanism can, however, also be provided for this purpose. The switch 15 is typically a microswitch.

If the motor 4 operates the pump 3 again, the pump 3 can initially convey fluid in the circuit. In this case, the fluid is conveyed through the start line 14 from the pressure chamber 10 into the suction chamber 9 by the pump 3 in the circuit. As a result of this, the pump 3 does not have to work against a large pressure when it is starting. As soon as the pump 3 has started and has a sufficient rotational speed, the volumetric flow in the start line increases in such a manner that the start valve 22 closes at the latest when, but in the embodiment much earlier, the pressure in the pressure chamber 10 is sufficient to open the check valve 24. In the case of a closed bypass valve 13, the state as in FIG. 1 is then reached again.

Figure 7:
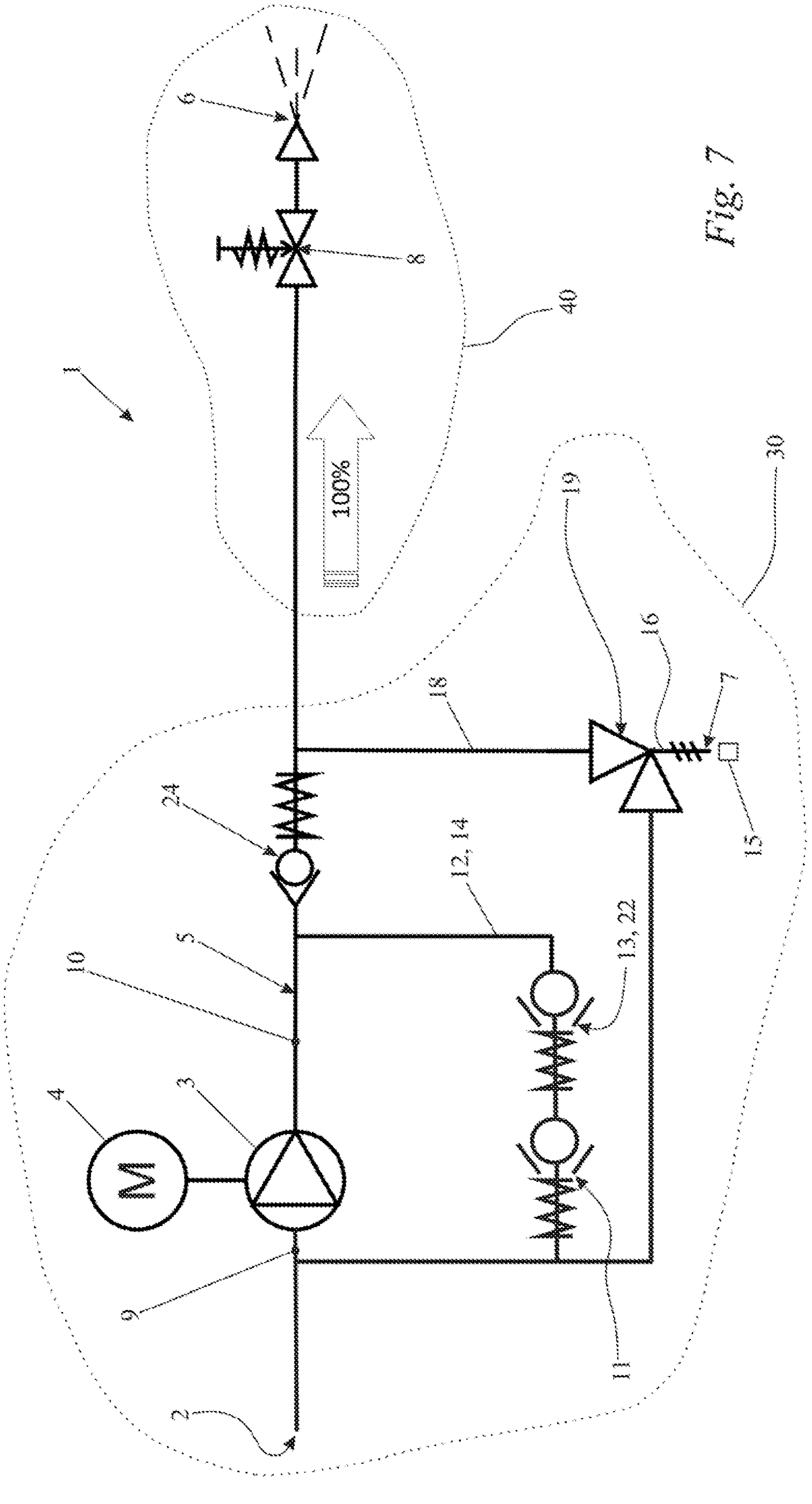

In the embodiment according to FIGS. 1 to 6, the start valve 22 is formed separately from the pressure build-up valve 11. In particular, there is provided in this embodiment a start line 14 which is formed separately from a bypass line 12. In an alternative embodiment according to FIG. 7, it can also be provided that the start valve 22 is arranged in the bypass line 12. The start line 14 is then identical to the bypass line 12. In particular, it can then also be provided that the start valve 22 and the bypass valve 13 possess a joint valve member. The spring hardness of the spring of the start/bypass valve 13/22 is then preferably adjustable. If the start/bypass valve 13/22 is closed after the starting of the pump 3 as a result of a corresponding starting volumetric flow, the spring hardness of the start/bypass valve 13/22 can be changed so that it opens again and allows a volumetric flow through the bypass line 12. The start/bypass valve can simultaneously take on the function of a pressure build-up valve. For this purpose, the start/bypass valve closes the bypass line from a certain volumetric flow. Due to the fact that the start/bypass valve satisfies three functions, installation space can be saved.

It is understood that the foregoing description is that of the preferred embodiments of the invention and that various changes and modifications may be made thereto without departing from the spirit and scope of the invention as defined in the appended claims.

The invention claimed is:

1. A pressure washer comprising:
a connection for a fluid source;
a high pressure pump;
a motor configured to drive said high pressure pump, wherein the motor has an on state and an off state;
a main line through which fluid is conveyable from said connection to a spray opening of said main line via said high pressure pump;
a switch-off unit;
said main line having a suction chamber between said connection and said high pressure pump, wherein said main line has a pressure chamber between said high pressure pump and said spray opening;
said pressure chamber being fluidically connected to said suction chamber via a bypass line, wherein the pressure washer is configured so that, in order to regulate a pressure in said pressure chamber, a free cross-sectional area surface of said bypass line is configured to be adjusted by a user;
wherein the pressure washer is configured such that said switch-off unit causes, as a result of the pressure which prevails in said pressure chamber, said motor to be in said off state if the pressure in the pressure chamber corresponds at least to a pressure threshold value;
a pressure build-up valve arranged in said bypass line; and,
wherein the pressure washer is configured such that said pressure build-up valve reduces said free cross-sectional area of said bypass line at least to such an extent when a volume threshold value of a volumetric flow through said bypass line is exceeded, that the pressure in said pressure chamber corresponds at least to said pressure threshold value.

2. The pressure washer of claim 1, wherein said pressure build-up valve is configured to close said bypass line when said volume threshold value of the volumetric flow through said bypass line is exceeded so that a throughflow of fluid through said bypass line is prevented.

3. The pressure washer of claim 1 further comprising:
a bypass valve arranged in said bypass line; and,
said free cross-sectional area of the bypass line being adjustable by a user via said bypass valve in order to regulate the pressure in said pressure chamber.

4. The pressure washer of claim 1 further comprising:
a main line valve arranged in said main line;
said main line valve being configured to prevent a throughflow of fluid through said main line in a closed state;
said main line valve being configured to allow the throughflow of fluid through said main line in an open state; and,
wherein the pressure washer is configured such that the pressure in said pressure chamber corresponds at least to said pressure threshold value once said main line valve has been switched from said open state into said closed state.

5. The pressure washer of claim 4, wherein said switch-off unit is configured to switch said motor into said off state during or after a transition of said main line valve from said open state into said closed state.

6. The pressure washer of claim 1, wherein said motor has a switch for switching said motor between said on state and said off state; said switch-off unit has an actuating element, wherein the fluid in said pressure chamber acts on said actuating element so that said actuating element actuates said switch of said motor so that said motor is in said off state if the pressure in said pressure chamber corresponds at least to said pressure threshold value.

7. The pressure washer of claim 1 further comprising:

a pressure relief line configured to connect said pressure chamber fluidically to said suction chamber;

a pressure relief valve arranged in said pressure relief line; and, said pressure relief valve being configured such that said pressure relief valve opens if the pressure in said pressure chamber corresponds at least to said pressure threshold value.

8. The pressure washer of claim 7, wherein;

said motor has a switch for switching said motor between said on state and said off state; said switch-off unit has an actuating element, wherein the fluid in said pressure chamber acts on said actuating element so that said actuating element actuates said switch of said motor so that said motor is in said off state if the pressure in said pressure chamber corresponds at least to said pressure threshold value; and, said pressure relief valve has a valve member and said valve member is movable jointly with said actuating element.

9. The pressure washer of claim 1, wherein said switch-off unit is only acted upon with a single pressure value of said pressure chamber.

10. The pressure washer of claim 1, wherein the pressure washer is configured such that there is a fluidic connection between the pressure chamber and said suction chamber if the pressure in said pressure chamber corresponds at most to a starting pressure value; and, said starting pressure value is smaller than said pressure threshold value.

11. The pressure washer of claim 10 further comprising:

a start valve; and, wherein the pressure washer is configured such that said start valve closes when a starting volume threshold value of the volumetric flow through said start valve is exceeded.

12. The pressure washer of claim 11, wherein said start valve is formed separately from said pressure build-up valve.

13. The pressure washer of claim 11, wherein said start valve is arranged in said bypass line.

14. The pressure washer of claim 13, wherein said start valve and said bypass valve possess a shared valve member.

15. The pressure washer of claim 1, wherein said switch-off unit is connected fluidically to said pressure chamber.

16. The pressure washer of claim 15 further comprising:

a check valve; and, said check valve being arranged in said pressure chamber downstream of said bypass line and upstream of said switch-off unit.

* * * * *